(12) United States Patent
Pothana

(10) Patent No.: US 9,282,373 B2
(45) Date of Patent: Mar. 8, 2016

(54) SYSTEM, METHOD, AND APPARATUS FOR MANAGING TIMESHIFT AND PERMANENT RECORDING IN A STORAGE DEVICE ON A VIDEO BROADCAST RECEIVER

(75) Inventor: Sai Krishna Pothana, Santa Clara, CA (US)

(73) Assignee: BROADCOM CORPORATION, Irvine, CA (US)

( * ) Notice: Subject to any disclaimer, the term of this patent is extended or adjusted under 35 U.S.C. 154(b) by 1637 days.

(21) Appl. No.: 12/611,723

(22) Filed: Nov. 3, 2009

(65) Prior Publication Data

US 2010/0325682 A1   Dec. 23, 2010

Related U.S. Application Data

(60) Provisional application No. 61/218,760, filed on Jun. 19, 2009.

(51) Int. Cl.

| | |
|---|---|
| *H04N 5/92* | (2006.01) |
| *H04N 21/472* | (2011.01) |
| *G11B 27/034* | (2006.01) |
| *G11B 27/10* | (2006.01) |
| *H04N 5/76* | (2006.01) |
| *H04N 21/433* | (2011.01) |
| *H04N 5/775* | (2006.01) |
| *H04N 5/781* | (2006.01) |
| *H04N 9/804* | (2006.01) |
| *H04N 9/806* | (2006.01) |
| *H04N 9/82* | (2006.01) |
| *H04N 9/87* | (2006.01) |

(52) U.S. Cl.
CPC ........ *H04N 21/47214* (2013.01); *G11B 27/034* (2013.01); *G11B 27/105* (2013.01); *H04N 5/76* (2013.01); *H04N 21/4331* (2013.01); *H04N 21/4333* (2013.01); *H04N 21/4334* (2013.01); *H04N 5/775* (2013.01); *H04N 5/781* (2013.01); *H04N 9/8042* (2013.01); *H04N 9/8063* (2013.01); *H04N 9/8205* (2013.01); *H04N 9/8715* (2013.01)

(58) Field of Classification Search
CPC ......... H04N 5/76; H04N 5/775; H04N 5/781; H04N 9/8042; H04N 21/47214; H04N 9/8205; H04N 9/8715; H04N 21/4331; H04N 21/4333; H04N 21/4334; H04N 9/8063; G11B 27/034; G11B 27/105
USPC .......................................... 386/241, 248, 295
See application file for complete search history.

(56) References Cited

U.S. PATENT DOCUMENTS

| | | | |
|---|---|---|---|
| 2003/0108331 A1* | 6/2003 | Plourde et al. | 386/83 |
| 2005/0071335 A1* | 3/2005 | Kadatch | 707/8 |
| 2011/0099338 A1* | 4/2011 | Binz et al. | 711/154 |

*Primary Examiner* — William Tran
(74) *Attorney, Agent, or Firm* — Foley & Lardner LLP

(57) ABSTRACT

Presented herein are system(s), method(s), and apparatus for managing timeshift and permanent recording in a storage device on a video broadcast receiver. In one embodiment, there is presented a system for recording programs. The system comprises memory, another memory, and a processor. The memory buffers recently displayed programs on a channel that said system is tuned. The another memory stores a plurality of instructions. The processor executes the plurality of instructions. Execution of the plurality of instructions causes writing the recently displayed programs on the channel that said system is tuned; writing a first list comprising at least one element, wherein each of the at least one elements indicate particular ones of the recently displayed programs; receiving an input indication a selection of presently displaying program for recording; and removing an element indicating the presently displaying program from the first list and adding the element to a second list.

18 Claims, 16 Drawing Sheets

SYSTEM, METHOD, AND APPARATUS FOR MANAGING TIMESHIFT AND PERMANENT RECORDING IN A STORAGE DEVICE ON A VIDEO BROADCAST RECEIVER

RELATED APPLICATIONS

This application claims priority to "Method for Managing Timeshift and Permanent Recording in a Storage Device on a Video Broadcast Receiver", Provisional Application for U.S. Patent Ser. No. 61/218,760, filed Jun. 19, 2009 by Pothana.

BACKGROUND OF THE INVENTION

Deciding to permanently record a presently watched television program while watching the program can involve the transfer of many gigabytes of data.

Further limitations and disadvantages of conventional and traditional systems will become apparent to one of skill in the art through comparison of such systems with the invention as set forth in the remainder of the present application with reference to the drawings.

BRIEF DESCRIPTION OF PREFERRED EMBODIMENTS

A system(s), method(s), and apparatus for managing timeshift and permanent recordings in a storage device on a video broadcast receiver substantially as shown in and/or described in connection with at least one of the figures, as set forth more completely in the claims.

DETAILED DESCRIPTION OF THE INVENTION

Figure 1:
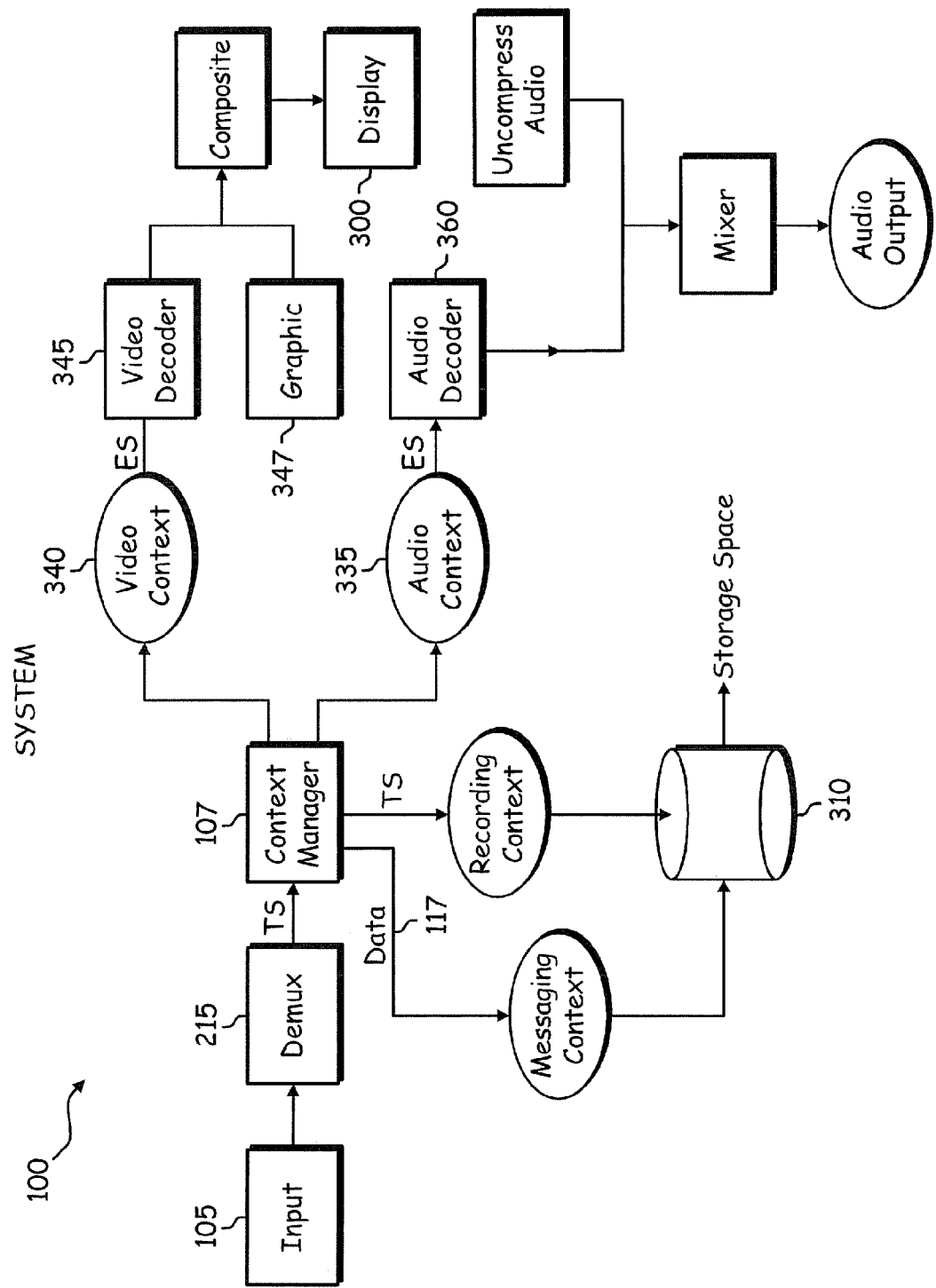
FIG. 1 is a system diagram illustrating an embodiment of a personal video recorder system in accordance with the present invention.

Referring now to FIG. 1, there is illustrated a block diagram describing an exemplary personal video recording system 100 in accordance with an embodiment of the present invention. The personal video recording system 100 comprises an input 105, DEMUX 215, a context manager 107, a video context 340, audio context 335, recording context 109, messaging control 111, video decoder 345 graphics engine 347, audio decoder 360, host processor 390, and display engine 300.

The input 105 can receive about data from a variety of sources, including communication networks, such as, but not limited to, cable network, satellite television network, the internet. The input 105 receives data in the form of multiplexed transport streams. The DEMUX 215 demultiplexes the transport streams 117. The transport streams are received by the context manager 107. The transport streams 117 can include video, audio, and navigation data.

It is noted that the context manager 107 receives audio and video transport streams from the DEMUX 215. The context manager 107 maintains two-way communication with a hard disc drive 310.

The audio context 335 and video context 340 receive the audio transport stream and video transport stream for display from the context manager 107. The audio transport stream and video transport stream can either come from the input 105 or the hard disc drive 310. The audio and video contexts extract the elementary streams from the transport streams and provide the elementary streams to the decoder. The audio decoder 360 decompresses the audio elementary stream. The video decoder 345 decompresses the video elementary stream. The decompressed video elementary stream is provided to a display engine 300. Additionally, a graphics engine 347 generates graphics to be mixed with the video (either overlay or blended). The display engine 300 generates the final composite display.

The context manager 107 can comprise, for example, a record audio/video engine such as described in "METHOD AND APPARATUS FOR DEMULTIPLEXING, MERGING, AND DUPLICATING PACKETIZED ELEMENTARY STREAM/PROGRAM STREAM/ELEMENTARY STREAM DATA", U.S. patent application Ser. No. 11/273,102, which is incorporated herein by reference. In certain embodiments of the present invention, the context manager 107 can selectively retrieve from or record to hard disc 310.

Figure 2:
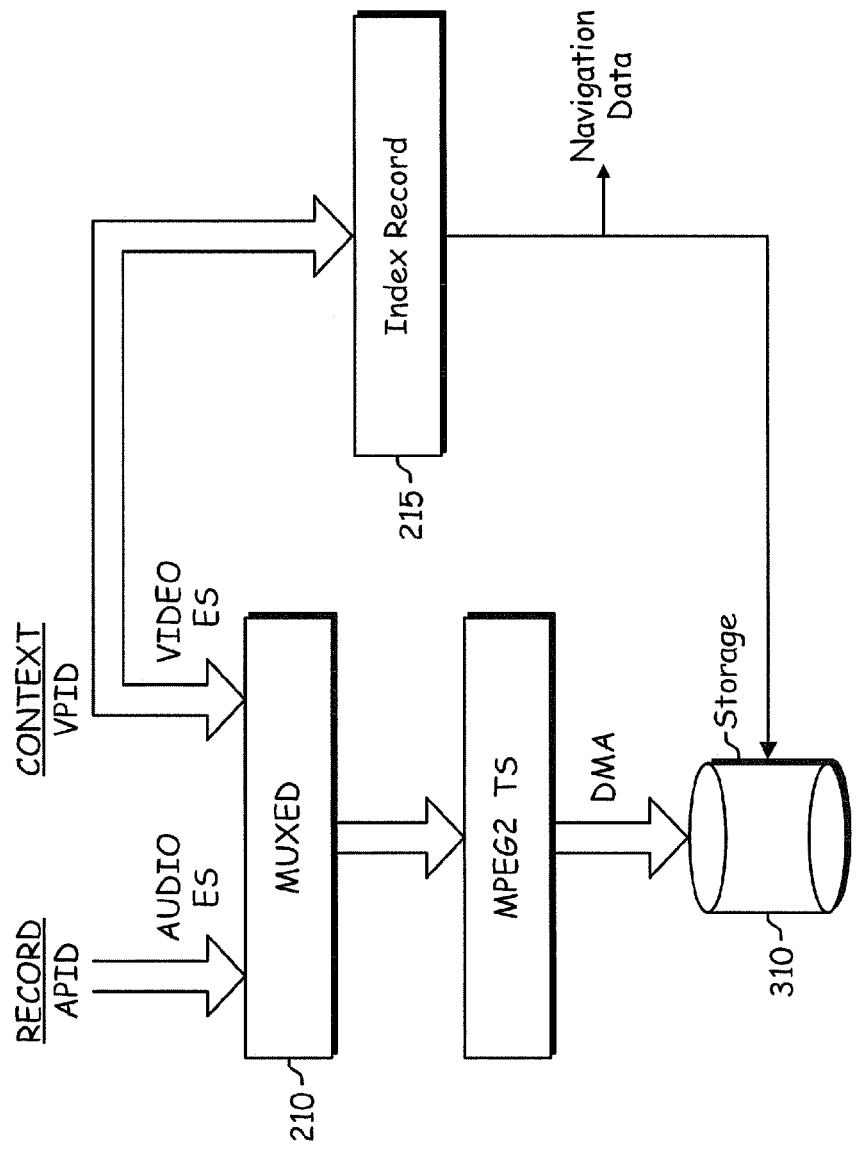
FIG. 2 is a system diagram illustrating an embodiment of a recording process in accordance with an embodiment of the present invention.

Referring now to FIG. 2, there is illustrated a block diagram describing an exemplary recording context. The recording context 109. The recording context 109 extracts the audio and video elementary streams and provides them to a multiplexer 210. The multiplexer 210 generates a transport stream that is stored in the hard disc drive 310. Additionally, an index record module 215 that generates navigation data that is also stored in the hard disc drive 310.

Figure 3:
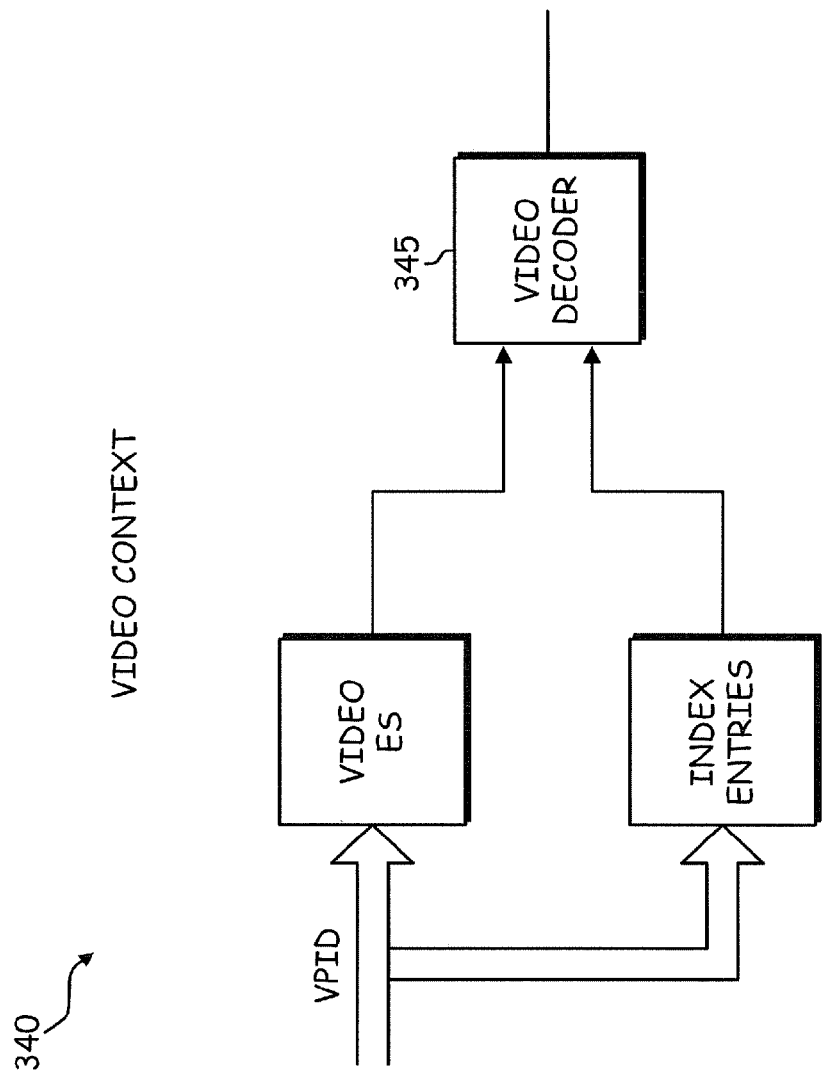
FIG. 3 is a system diagram illustrating an embodiment of a video playback process in accordance with an embodiment of the present invention.

Referring now to FIG. 3, there is illustrated a block diagram describing a video context 340. The video context 340 extracts the video elementary stream from the transport stream and provides the video elementary stream to the video decoder 345. The video context 340 also provides index entries to the video decoder 345.

The hard disc 310 stores recorded programs. Recorded programs include temporarily buffered programs and permanently stored programs. When a user is watching a particular program, the watched program can be temporarily recorded to allow for trick modes, such as rewind. The recording is temporary because it is subject to certain limitations. For example, only a set preceding time of programs are recorded. Additionally, the temporarily recorded program are considered deleted when the user changes the channel or stops watching.

An Electronic program guide has details on which program is broadcast on which frequency/channel number and at what time and the duration of the program. PAT (Program Association Table) has all the information showing the association of a PMT (Program Map Table) PID and a program number of all the programs contained in a transport stream. PMT has information on all the elementary streams that make up a single program on a TV channel. This effectively means that audio ES type, video ES type, audio PID, video PID, start and end time, encryption on/off and duration of a program can be extracted from EPG, PAT, PMT and other tables.

An exemplary Electronic Program Guide structure is shown below:
1. Application Information
2. Programming Information—It contains:
  a. The network ID.
  b. The start date and time, stop time
  c. Themes Categories and ratings
  d. Subtitle, language and other information
  e. A title
  f. Short and long textual description
3. Navigation Information
4. OSD Information
5. Update Information
6. Language Information and Subtitle Information
7. Helper Information Referring now to FIG. 4, there is illustrated a block diagram of an exemplary time shift list 400. Upon tuning to a channel, a data structure, now referred to as a time shift list 400, is created by the processor 390. In certain embodiments of the present invention, the time shift list can be created by a transport processor. The programs 405 that are watched while tuned to a particular channel are temporarily recorded in memory 310. This allows the user to perform trick mode functions such as rewind. Thus, the time shift list 400 lists a limited number of previous programs. In certain embodiments, the time shift list 400 can be discarded when the user changes channels or stops watching. In other embodiments, the time shift list 400 can be stored for a brief amount of time after a channel change.

Each program 405 is associated with a transport node and a program node. The transport node 500 the previous and next program in the time shift list 400. The program node 600 indicates information regarding the program.

Figure 5:
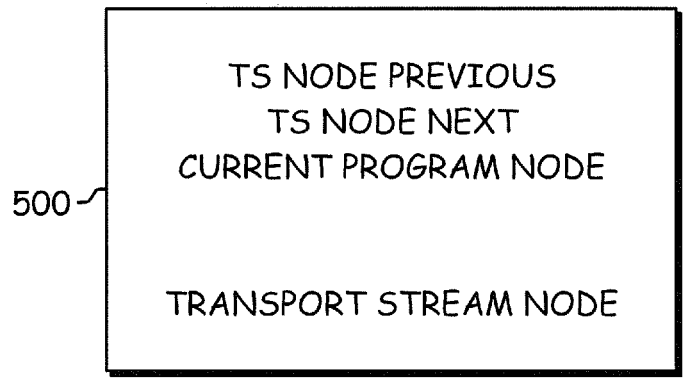
FIG. 5 is a block diagram of an exemplary transport stream node in accordance with an embodiment of the present invention.

Referring now to FIG. 5, there is illustrated a block diagram describing an exemplary transport stream node 500 in accordance with an embodiment of the present invention. The transport stream node includes a previous program field .TS_Node_Previous which indicates the previous program in the time shift list 400, a next program field, .TS_Node_Next that indicates the next program in the time shift list 400 and a current program field, .Current_Program_Node that points to the program node.

Figure 6:
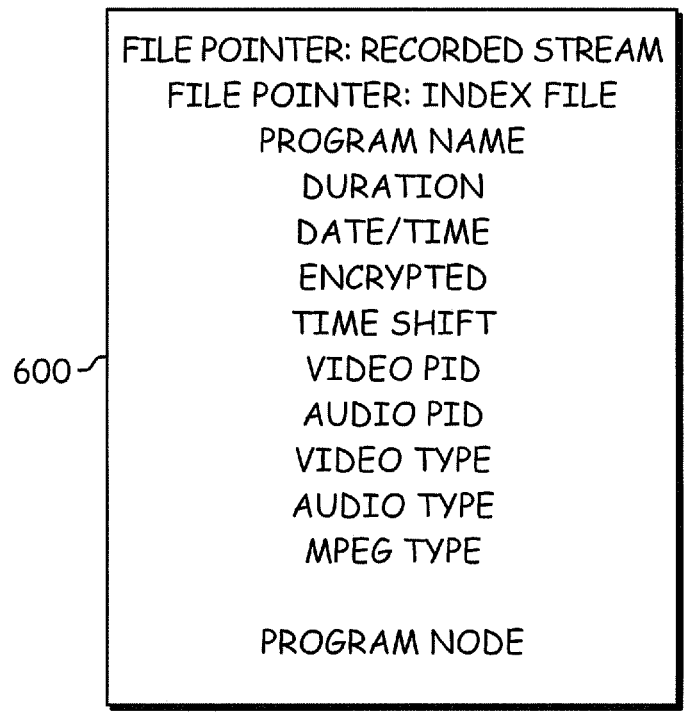
FIG. 6 is a block diagram of an exemplary program node in accordance with an embodiment of the present invention.

Referring now to FIG. 6, there is illustrated a block diagram describing an exemplary program node 600 in accordance with an embodiment of the present invention. The program node 600 includes the following fields:

| | |
|---|---|
| File Pointer: Recorded Stream | File name of program |
| File Pointer: Index File | Address stored in memory |
| Program Name | Name of Program |
| Duration | Length of program |
| Date/Time | Date and time of program |
| Encrypted | Is program encrypted |
| Time Shift | Is program to remain in time shift list |
| Video PID | Video PID assigned in PAT |
| Audio PID | Audio PID assigned in PAT |
| Video Type | Format of Video |
| Audio Type | Format of Audio |
| MPEG Type | Packet format |

Much of this information can be extracted from the electronic program guide.

Referring again to FIG. 4, while watching a program, e.g., "Harry Potter" 405(2), a user can choose to permanently record the program. Accordingly, the time shift flag in the program node 600 is set. When the end of the program is reached, the time shift flag is checked. Since the time shift flag indicates that the user decided to permanently record program 405(2), the transport node 400 and the program node 500 are removed from the time shift list 400. The .TS_Node_Next of program 405(1) is set to equal the .TS_Node_Next of program 405(2), while the .TS_Node_Previous of program 405(3) is set to equal the .TS_Node_Previous of program 405(2).

Figure 4:
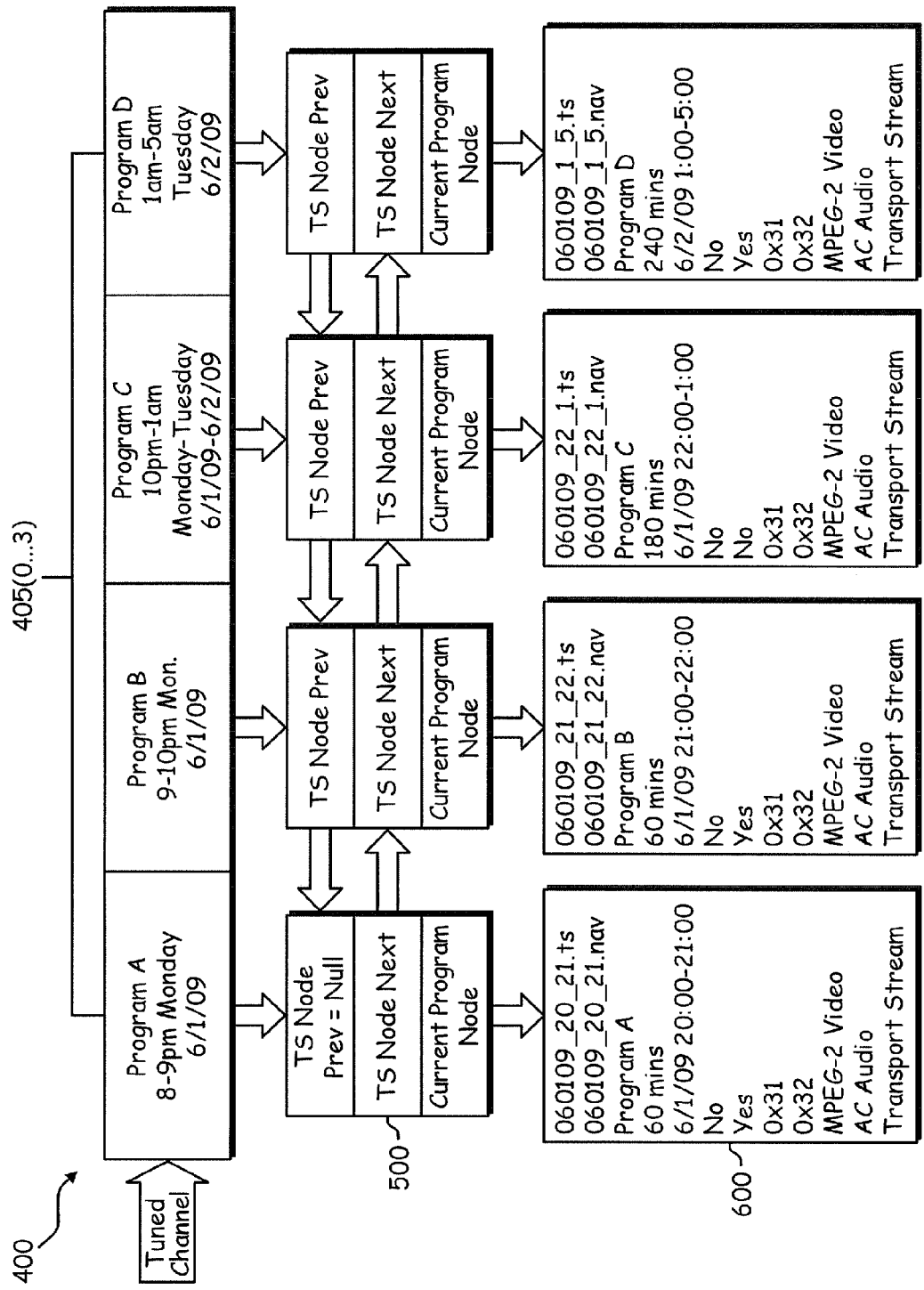
FIG. 4 is a block diagram of an exemplary time shift list in accordance with an embodiment of the present invention.
Figure 7:
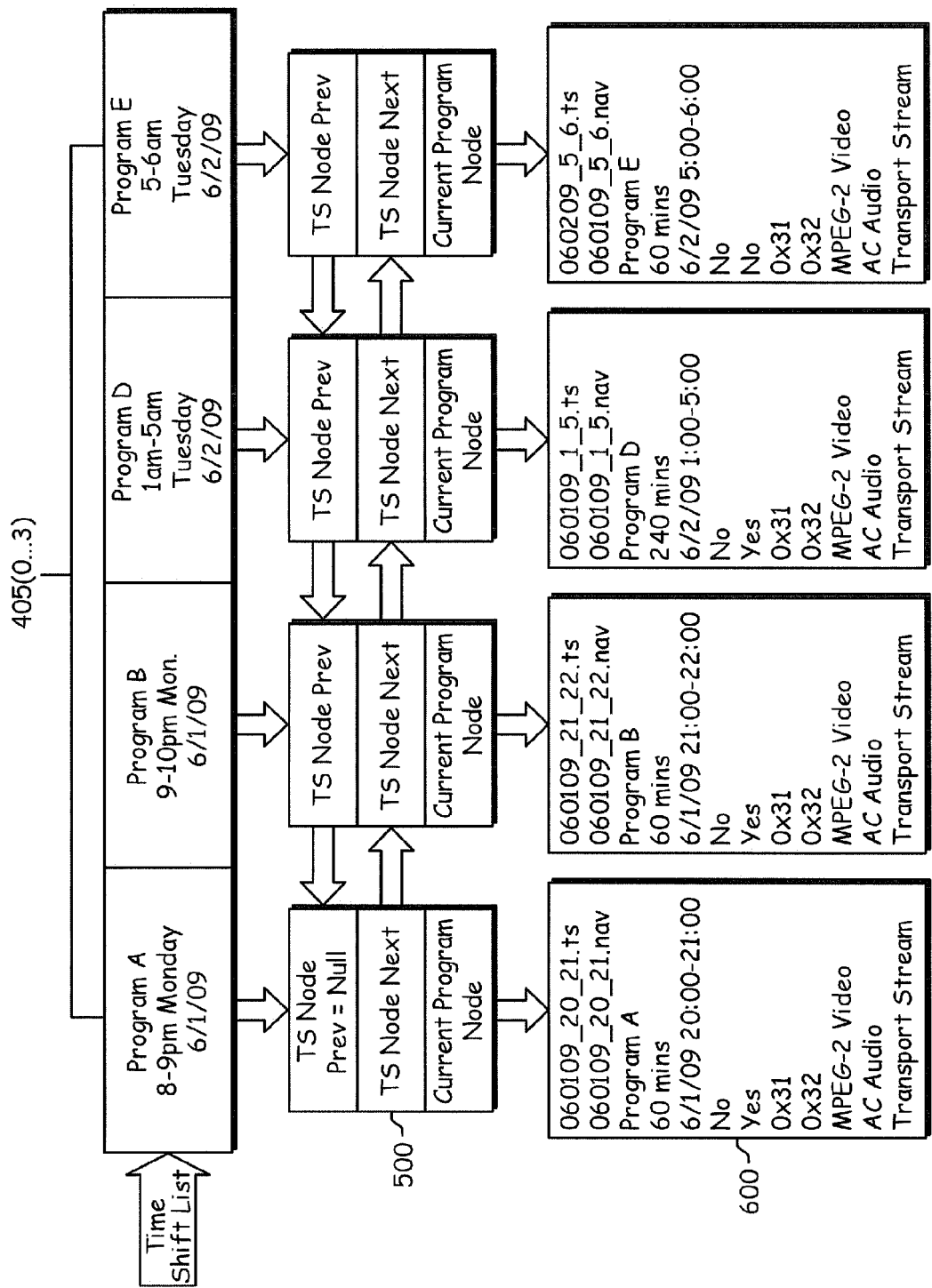
FIG. 7 is a block diagram of an exemplary time shift list after selection of program for permanently recording in accordance with an embodiment of the present invention.

Referring now to FIG. 7, there is illustrated a block diagram describing the time shift list 400 after the foregoing. As can be seen, program 405(3) in FIG. 4 is now program 405(2) in FIG. 7. Additionally, there is a new program 405(3).

Figure 8:
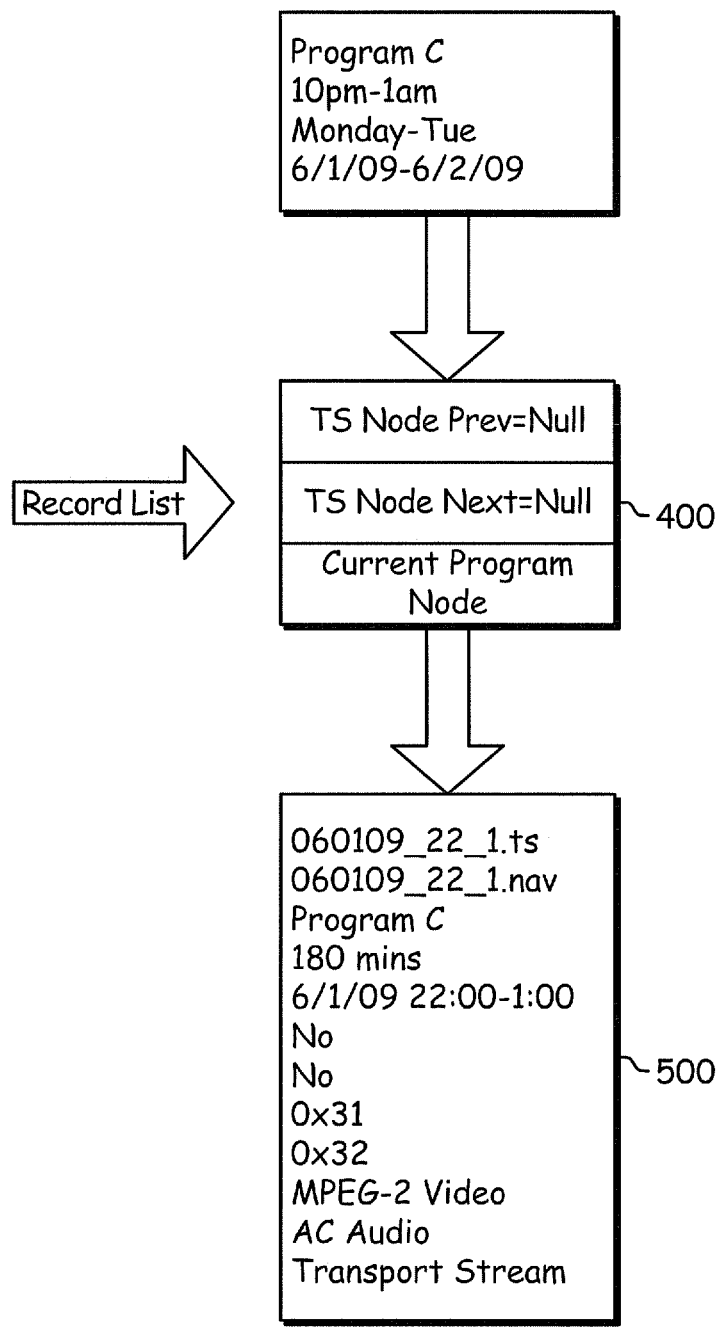
FIG. 8 is a block diagram of an exemplary permanent recording list in accordance with an embodiment of the present invention.

Referring now to FIG. 8, there is illustrated a block diagram describing an exemplary permanent recording list 800. The permanent recording list 800 also comprises transport stream nodes 400 and program stream nodes 500. It is noted that the program stream node 500 store the same data when the program was part of the time shift list 400.

Figure 9:
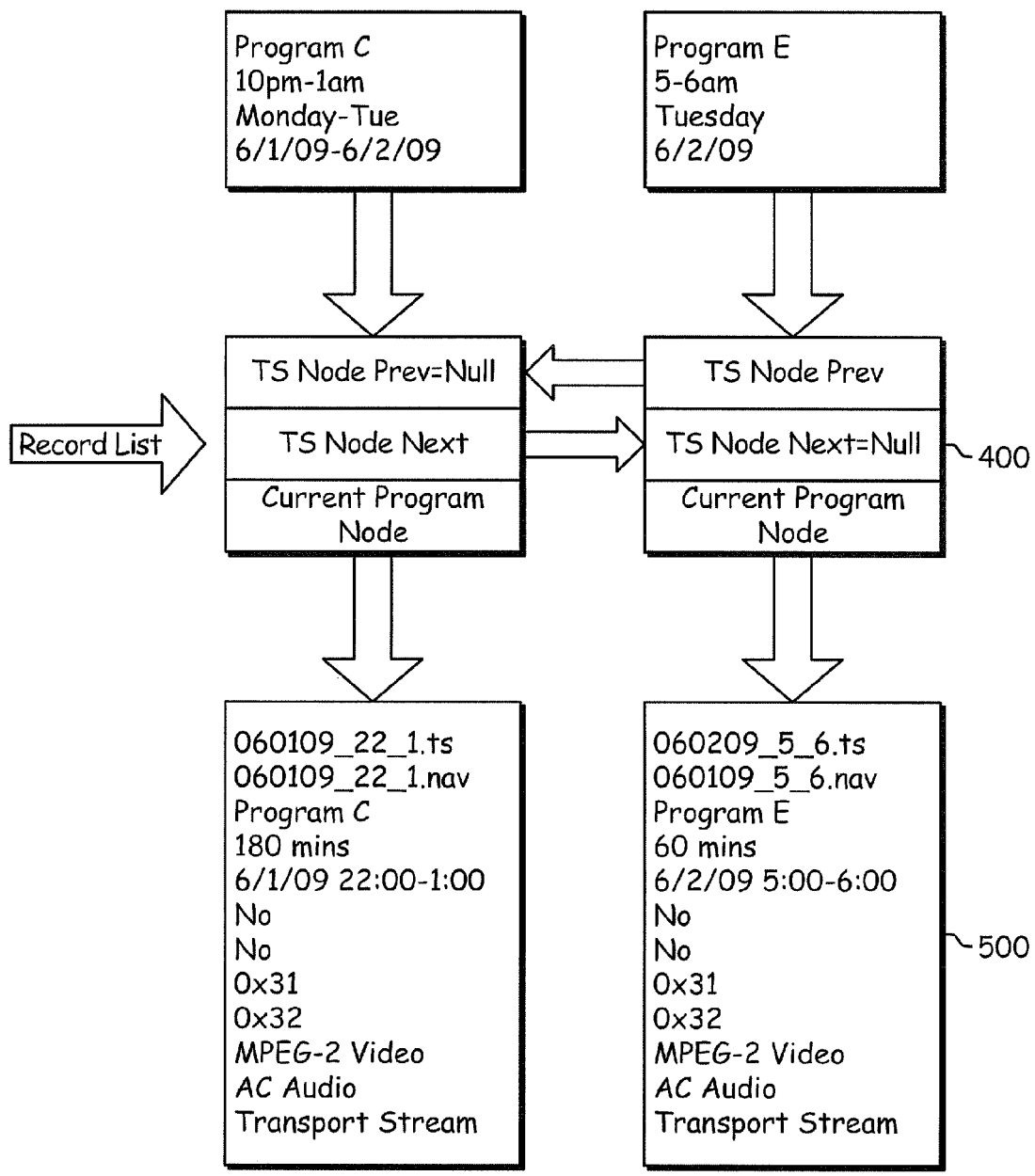
FIG. 9 is a block diagram of a permanently recorded list after addition of a program from the time shift list in accordance with an embodiment of the present invention.

Referring now to FIG. 9, there is illustrated a block diagram describing the permanent recording list 800 after addition of another program. The transport stream nodes 400 are linked. Again, it is noted that the program stream nodes 500 store the same data when the program was part of the time shift list 400.

This way recorded data is moved between the Time Shift and Permanent Recording List giving the user the flexibility of having enough live TV buffering and a Permanent Recording of programs that the user wishes to see at a future time.

There is no actual copying of program data involved between Time Shift and Permanent Recording List rather only the metadata associated with each program, e.g., the transport stream node and the program stream nodes, are moved from Time Shift to Permanent Recording List.

A Delete List can also be created that shall comprise of similar Transport Stream and Program Nodes. When a user deletes a permanent recording, the corresponding Transport Stream Node and Program Node shall be moved to a Delete list.

In case, the user wishes to recover the deleted recording, then the Transport Stream and Program Node can be moved back from the Delete List to the Permanent Recording List assuming that it's not deleted by the resource management managing the storage device.

Figure 10:
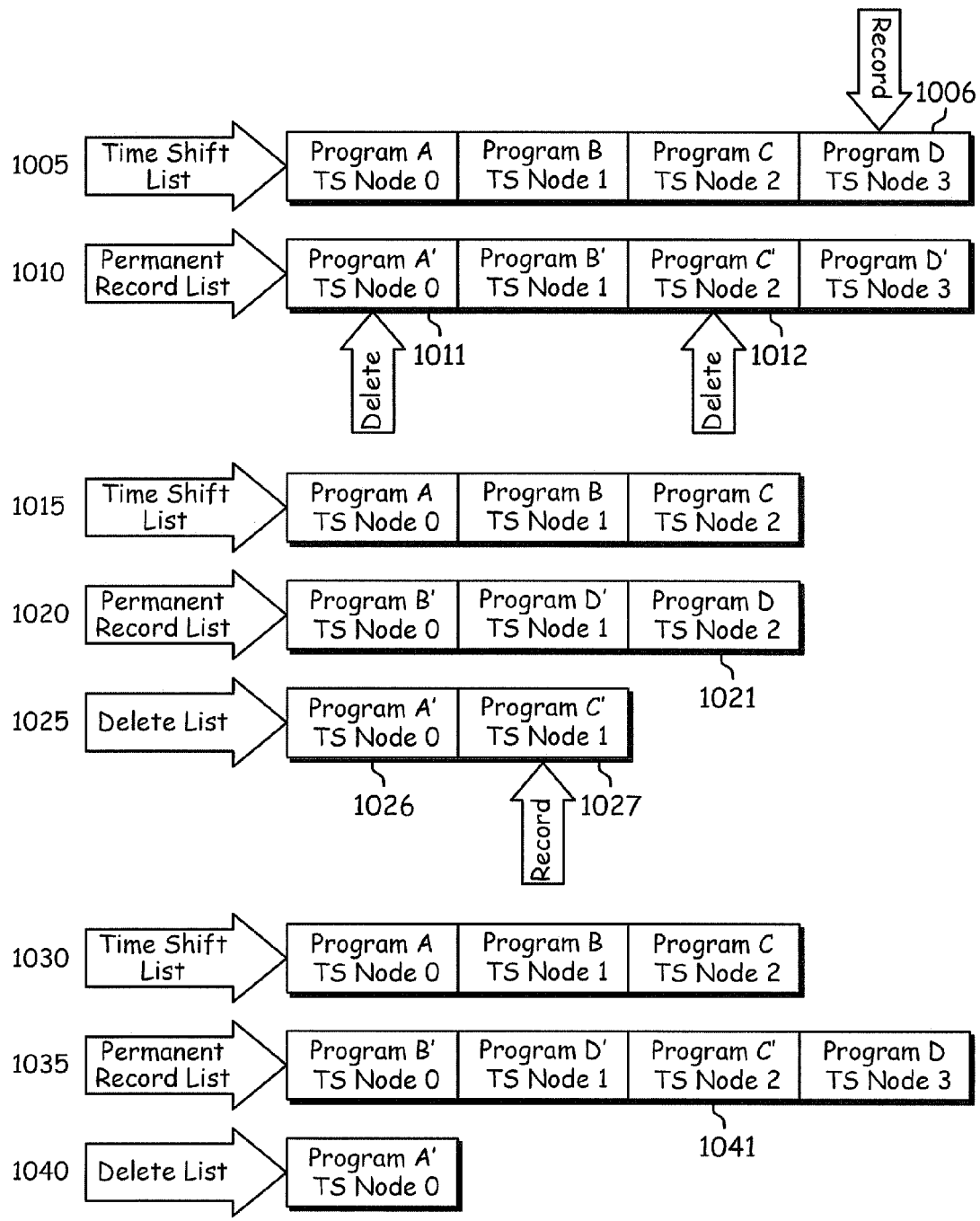
FIG. 10 is a block diagram describing deletion of programs in accordance with an embodiment of the present invention.

Referring now to FIG. 10, there is illustrated a block diagram describing recording, deleting, and recovering program in accordance with an embodiment of the present invention. Time shift list 1005 includes programs, wherein the user has selected one of the programs 1006 for recording. Permanent Record List 1010 includes permanently recorded program, wherein some of the programs 1011 and 1012 are selected for deletion.

Time shift list 1015 is the time shift list after the selected program is added to the permanently recorded list. Permanently recorded list 1020 is the permanently record list after deletion of selected programs and recording of another selected program 1021. Delete list 1025 is created that includes programs 1026 and 1027. Program 1027 is indicated for recovery.

Permanent record list 1035 includes the recovered program 1041, and the recovered program is no longer in the delete list 1040.

In certain embodiments of the present invention, each program can be associated with a plurality of program nodes 600, wherein each node is associated with a certain portion of the program. For example, certain programs such as sporting events and movies are lengthy and beyond the 30 minutes that has become unit length of programs. Accordingly, programs can be associated with a number of program nodes based on how many 30 minute intervals the program lasts.

Of course, the number of program nodes that are associated with each program can be associated with other length time intervals, such as 5, 10, 15, and 20 minutes.

Figure 11:
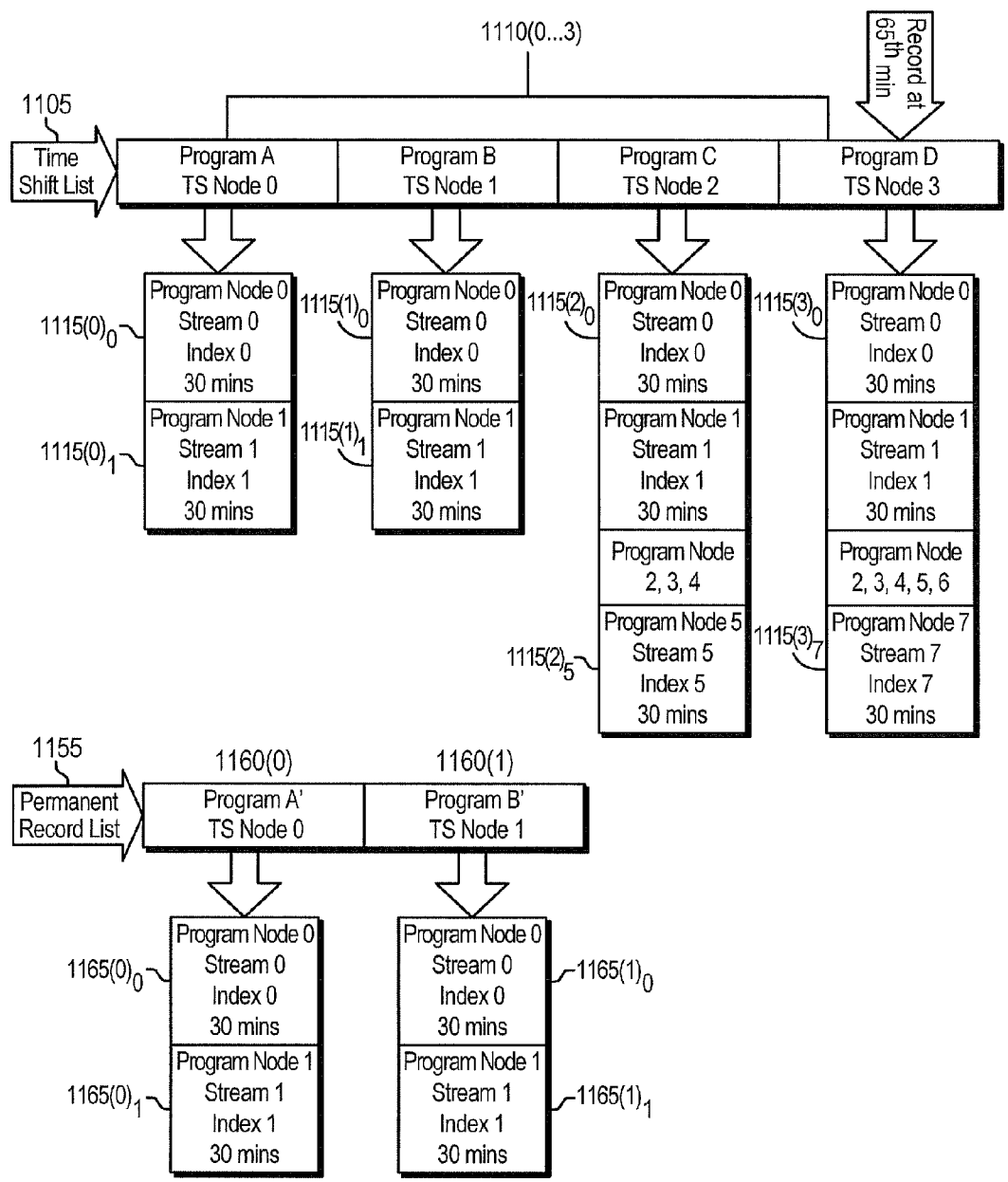
FIG. 11 is a block diagram of a time shift list and a permanently recorded list with programs that are divided into portions.

Referring now to FIG. 11, there is illustrated a block diagram describing an exemplary time shift list 1105 and permanent record list 1155. The time shift list 1105 comprises the plurality of programs 1110(0 . . . 3) that are proximate in time to the watched program on the channel selected.

It is noted that each of the programs 1110 is longer than 30 minutes. Accordingly, program 1110(0), one hour in length, has two program nodes $1115(0)_0$, $1115(0)_1$, program 1110(1), one hour in length, has two program nodes $1115(1)_0$, $1115(1)_1$, program 1110(2), three hours in length, has six program nodes $1115(2)_0$ . . . $1115(2)_5$, and program 1110(3) has eight program nodes $1115(2)_0$ . . . $1115(2)_7$.

The permanent record list 1155 comprises the plurality of programs 1160(0,1) that are permanently recorded. It is noted that each of the programs 1160 is longer than 30 minutes. Accordingly, program 1160(0), one hour in length, has two program nodes $1165(0)_0$, $1165(0)_1$, and program 1165(1), one hour in length, has two program nodes $1165(1)_0$, $1165(1)_1$.

According to certain embodiments of the present invention, a user can select a portion of a program for permanent recording. For example, a user can select program 1110(3) for recording after 65 minutes. Accordingly, the time shift flag for program nodes $1115(3)_2$ . . . $1115(3)_7$, is set indicating that the program nodes $1115(3)_2$ . . . $1115(3)_7$ should be transferred to the permanent recording list after completion.

Figure 12:
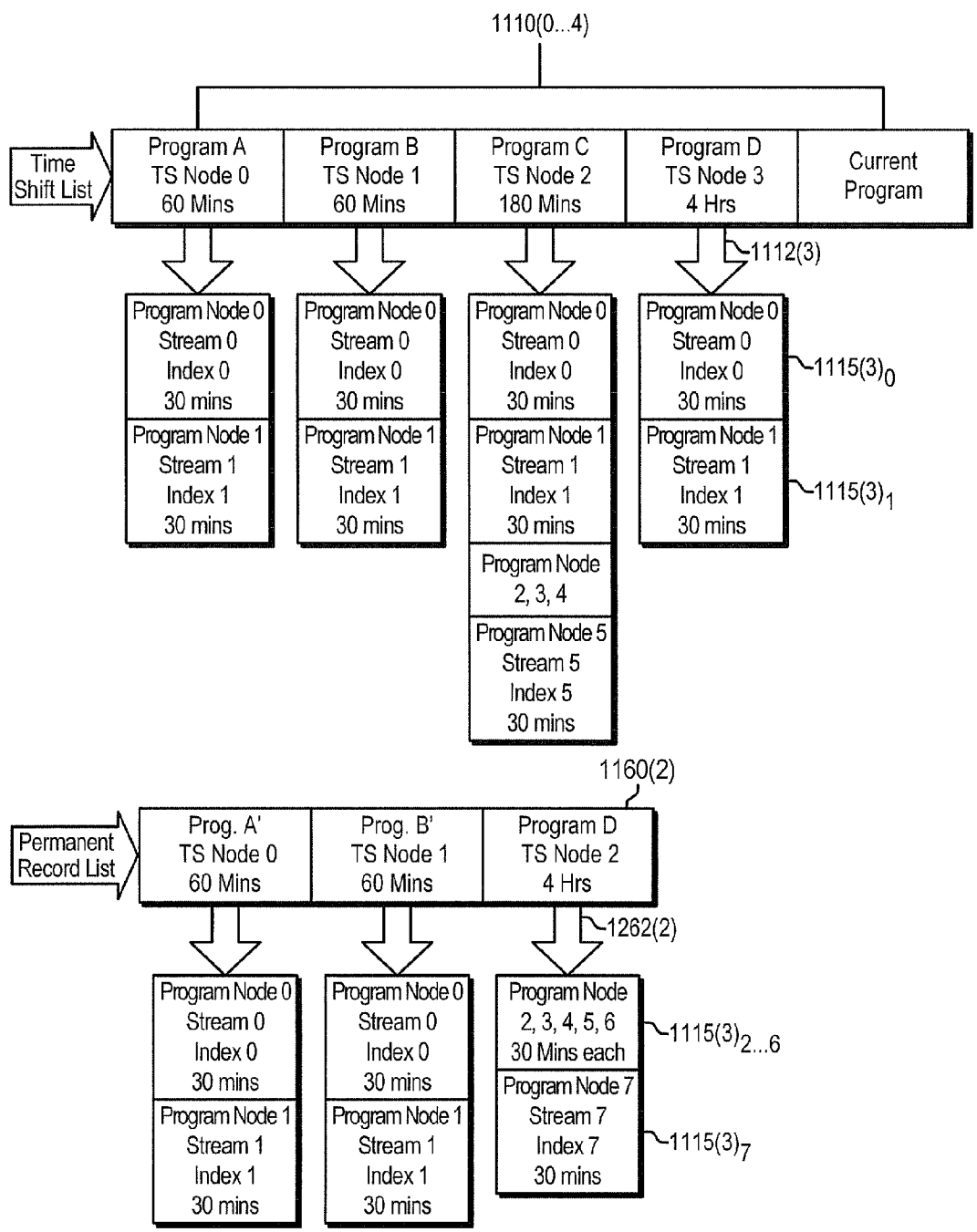
FIG. 12 is a block diagram describing adding a portion of a program in the time shift list to the permanently recorded list in accordance with an embodiment of the present invention.

Referring now to FIG. 12, there is illustrated a block diagram describing the time shift list and the permanent record list after completion of program 1115(3). The program nodes $1115(3)_2$ . . . $1115(3)_7$, are added to the permanent record list and removed from the time shift list, while program nodes $1115(3)_0$, and $1115(3)_1$ remain in the time shift list.

Additionally, transport node 1112(3) for program 1110(3) is modified to point to the next program 1112(4). In the permanent record list, a new transport node 1262(2) is generated. The transport nodes for programs 1160(1) and 1160(2) are set to point to each other. It is noted that program nodes $1115(3)_2$ . . . $1115(3)_7$ remain the same, including the field indicating the memory address of the program portions.

In certain embodiments of the present invention, each program node can support Personal Video Recording Trick (PVR) Modes. Each Program Node can have an Index file to support host based PVR modes. Index file has a list of navigation records. An exemplary navigation format is described below:

Navigation Entry Format
  0 frameType
  1 seqHdrStartOffset
  2 seqHdrSize
  3 refFrameOffset
  4 frameOffsetHi
  5 frameOffsetLo
  6 framePts
  7 frameSize
  8 timestamp
  9 contentRating
  10 caInfo
  11 errFlags Navigation/Index files can be written to a smaller partition of a storage device and this partition can have a file system that is best suitable for handling small files. Program/Stream files shall be written to a larger partition of a storage device and this partition shall have any file system that is best suitable for handling large files.

Figure 13:
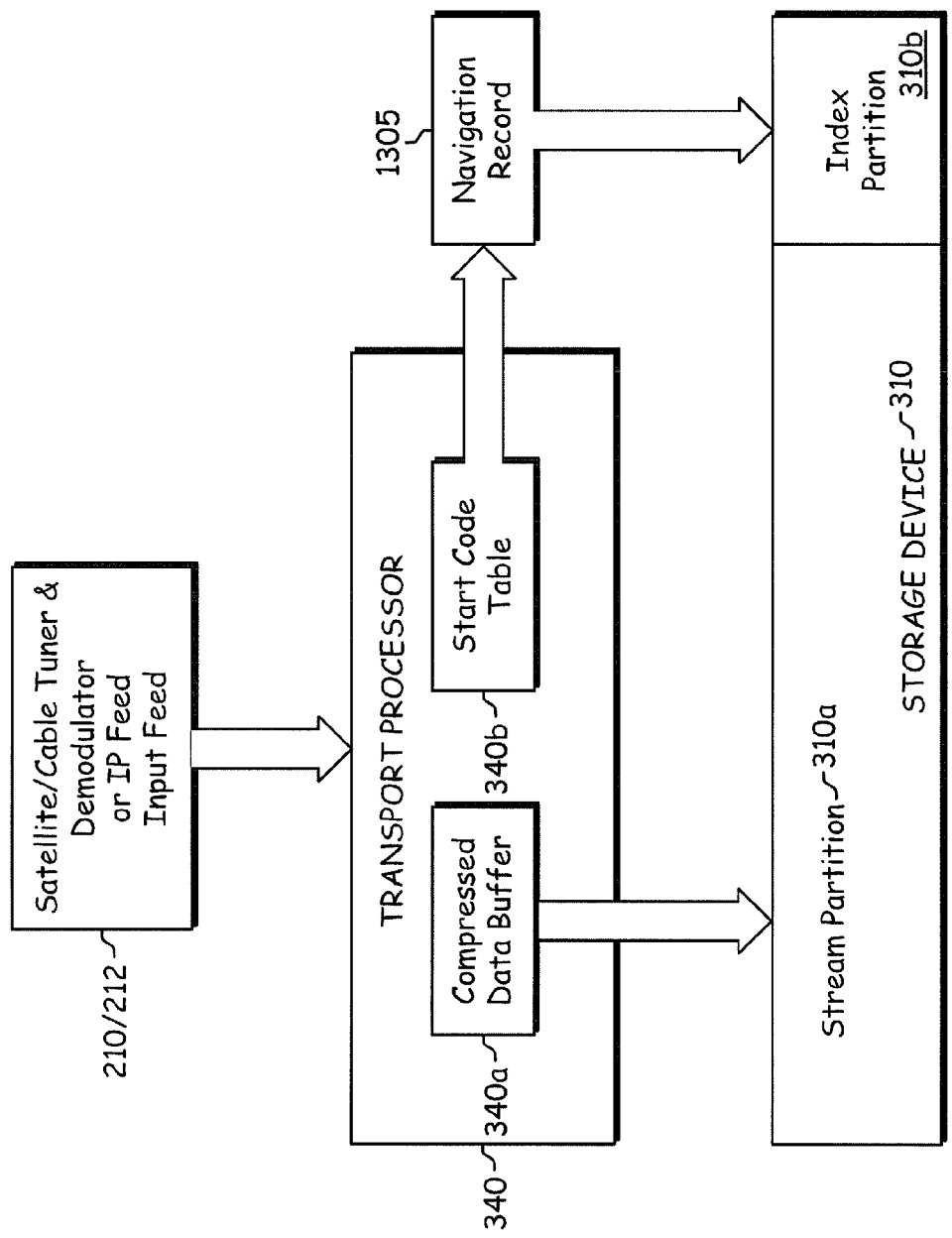
FIG. 13 is a block diagram of an exemplary memory management system in accordance with an embodiment of the present invention.

Referring now to FIG. 13, there is illustrated a block diagram describing storage of video data in accordance with an embodiment of the present invention. The tuner and demodulator 210/212 provide transport packets from the selected channel and the electronic program guide. The transport processor 340 stores the compressed data from the transport packets into the compressed data buffer 340a. The data stored in the compressed data buffer is then stored in the storage device 310. The transport processor 340 also stores start codes in the start code table 340b. The transport processor 340b creates navigation records 1305 for storage in the index partition of the storage device 310.

Figure 14:
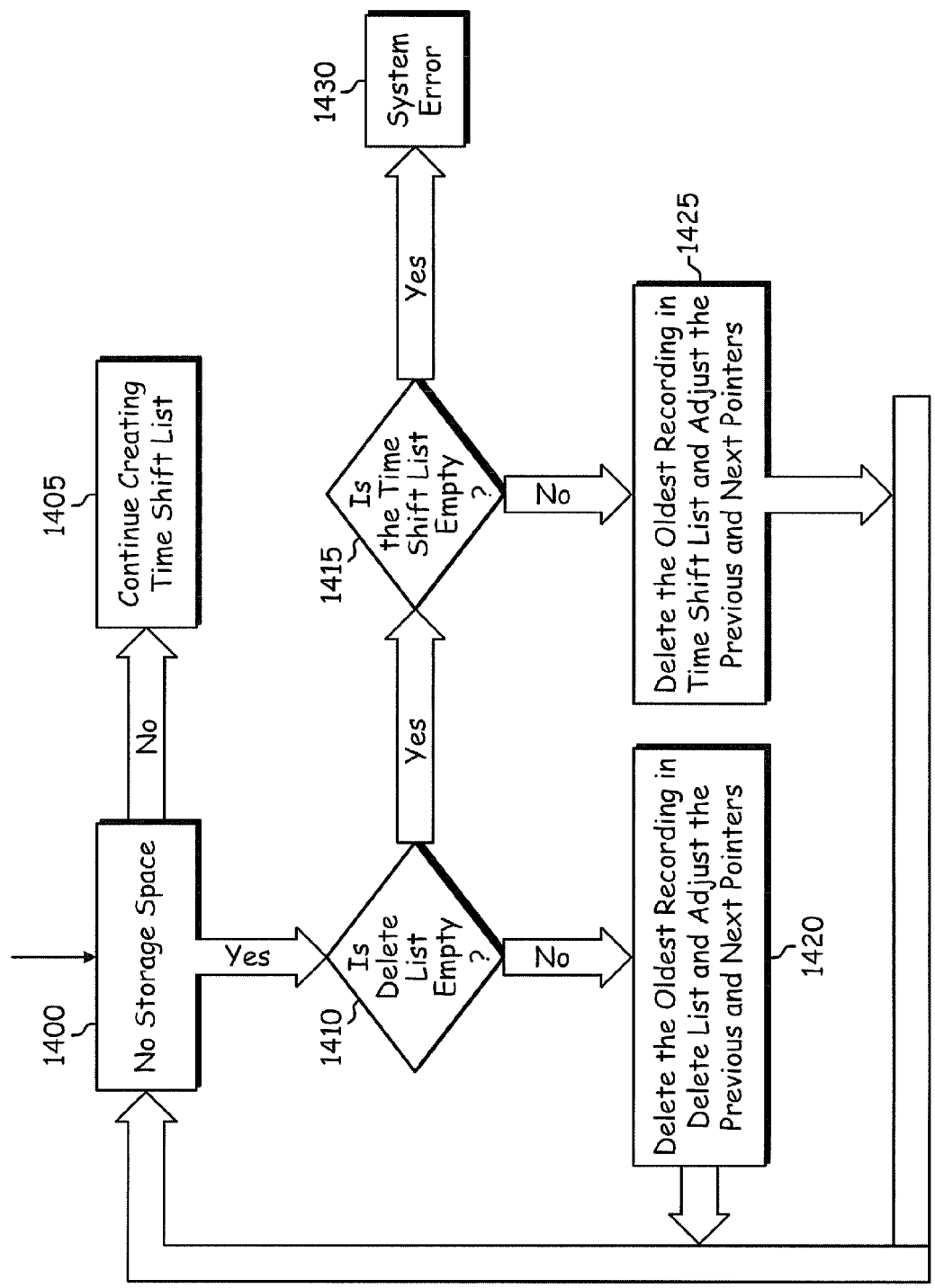
FIG. 14 is a flow diagram for managing a memory system in accordance with an embodiment of the present invention.

Referring now to FIG. 14, there is illustrated a flow diagram for managing the storage device 310 in accordance with an embodiment of the present invention. At 1400, a determination is made whether there is storage space remaining. If there is, at 1405, the time shift list creation is continued.

If there is no storage space at 1400, at 1410, a determination is made whether the delete list is empty. If the delete list is not empty at 1410, at 1420, the oldest recording in the delete list is delete and the previous and next pointers are adjusted.

If at 1410, the delete list is empty, at 1415, a determination is made whether the time shift list is empty. If not, at 1425, the oldest recording in the time shift list is deleted and the previous and next pointers in the transport stream node are adjusted. Otherwise, at 1430, a system error is asserted.

Figure 15:
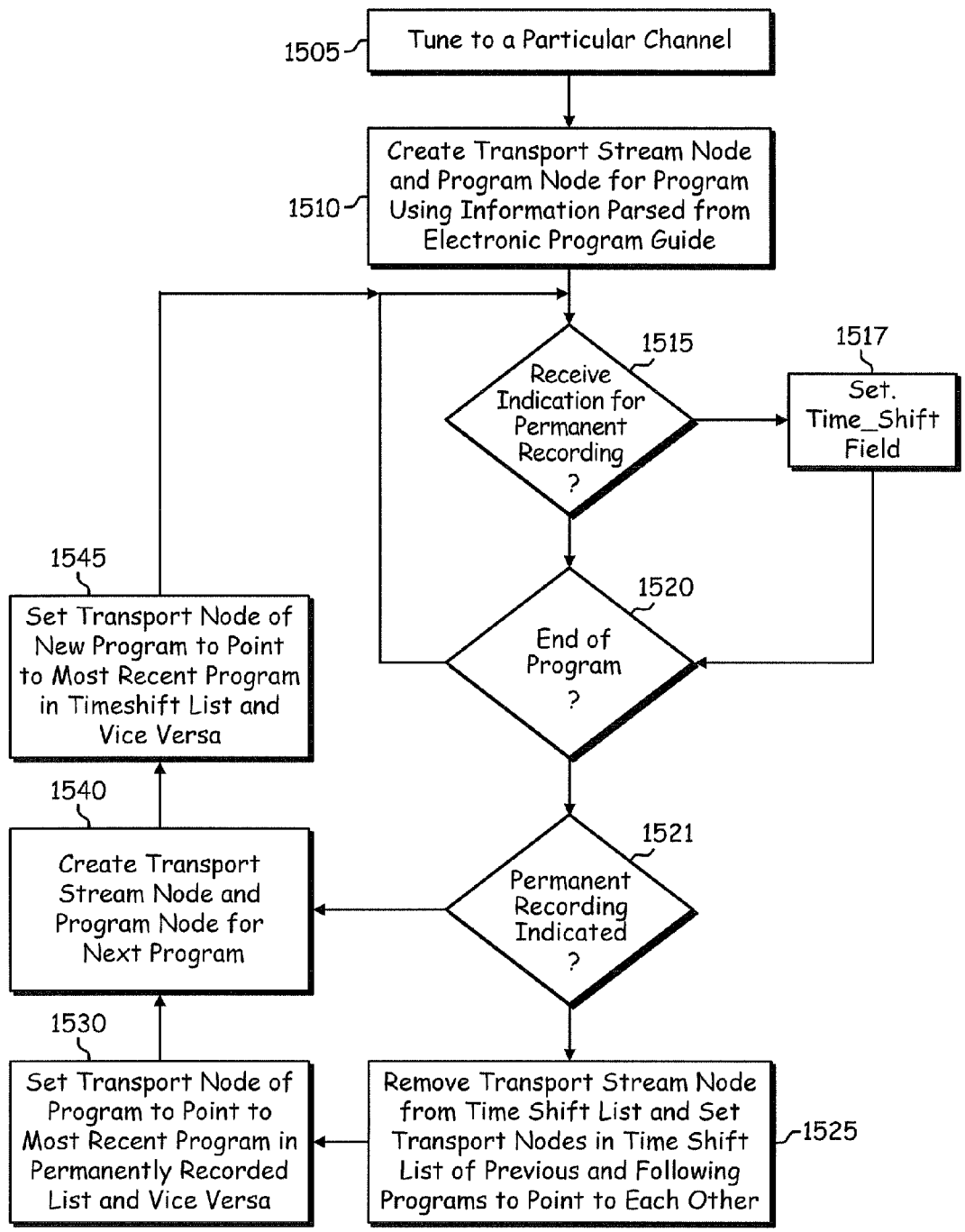
FIG. 15 if a flow diagram for adding a program from the time shift list to the permanently recorded list.

Referring now to FIG. 15, there is illustrated a flow diagram recording a presently viewed program in accordance with an embodiment of the present invention. At 1505, the user tunes to a particular channel, and a time shift list is created by processor 390. At 1510, the processor creates a transport stream node 500 and a program node 600 for the program using information parsed from the electronic program guide. At 1515 and 1520, the processor 390 polls whether the user has indicated that they would like to permanently record the program and whether the program has ended. If at 1515, the user has indicated that they would like to permanently record the program, at 1517, the field .time_shift in the program node 600 is set to so indicate.

When the program has completed at 1520, the processor makes a determination whether the user has requested to permanently record the program or not by checking .time_shift in the program node 600 at 1521. If the user has indicated for the program to be permanently recorded, at 1525, the transport stream node 500 is removed from the time shift list 400, and the transport stream nodes 500 of the programs before and after are set to point to each other. At 1530, the transport stream node 500 is set to point to the most recent program in the permanently recorded list and vice versa.

If the program has ended, and the user has not indicated that the program is to be permanently recorded, at 1540, the processor creates a transport stream node 500 and a program node 600 for the next program using information parsed from the electronic program guide. At 1545, the processor sets the transport stream node 500 to point to the transport stream node 500 of the previous program, and vice versa.

Figure 16:
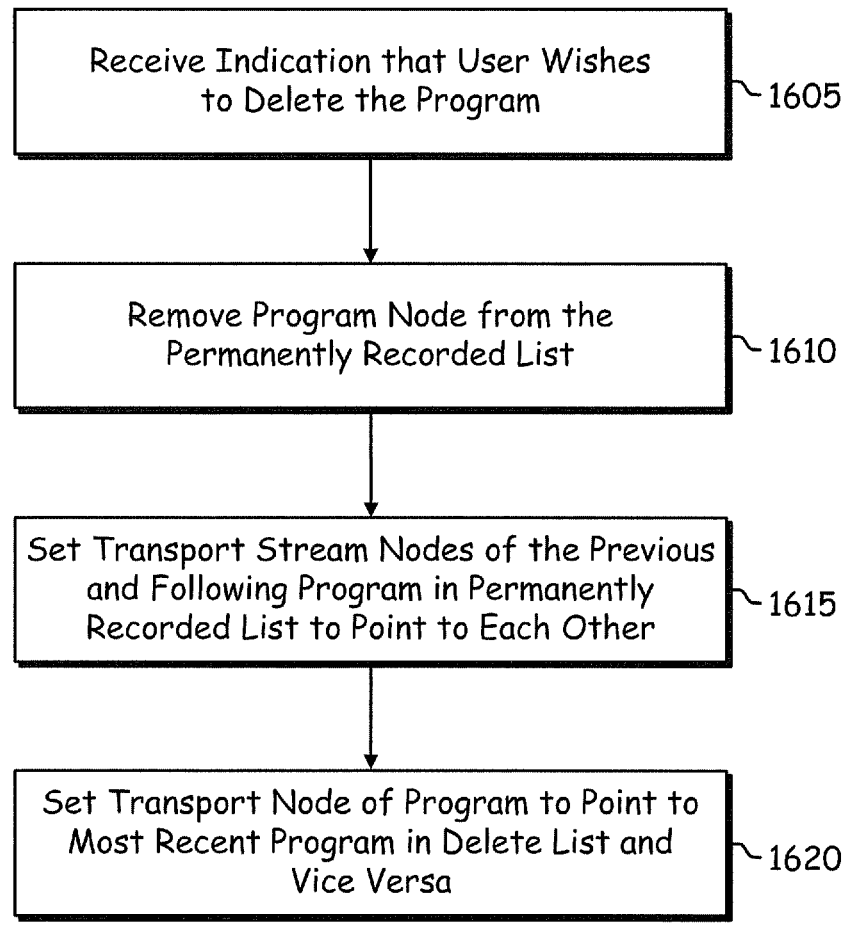
FIG. 16 is a flow diagram for deleting a program in accordance with an embodiment of the present invention.

Referring now to FIG. 16, there is illustrated a flow diagram for deleting a program from the time shift list or the permanent recording list. At 1605, the processor 390 receives an indication that the user wishes to delete the program. At 1610, the transport stream node 500 and program node 600 are removed from the permanently recorded list. The transport stream nodes of the previous and following programs are set to point to each other at 1615. The transport stream node 500 is set to point to the most recent program on the delete list at 1620 and vice versa.

Figure 17:
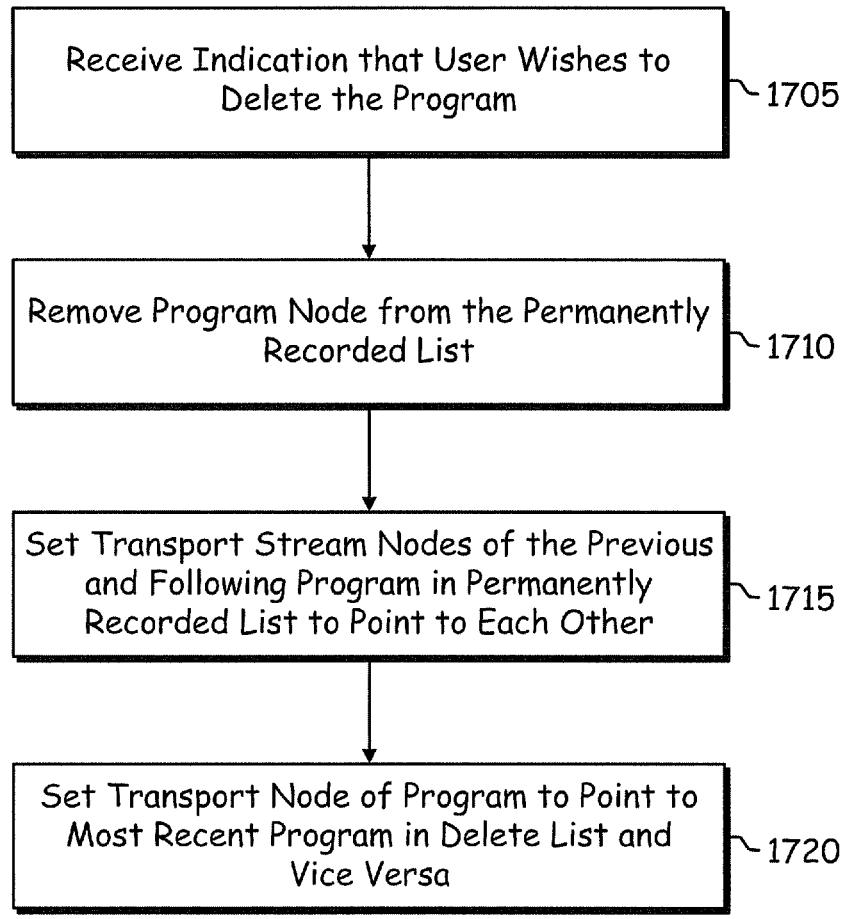
FIG. 17 is a flow diagram for recovering a deleted program in accordance with an embodiment of the present invention.

Referring now to FIG. 17, there is illustrated a block diagram for recovering a deleted program from the deleted program list. At 1705, the processor 390 receives an indication that the user wishes recover a deleted program. At 1710, the transport stream node 500 and program node 600 are removed from the deleted list. The transport stream nodes of the previous and following programs in the deleted list are set to point to each other at 1715. The transport stream node 500 is set to point to the most recent program on the permanently recorded list at 1720 and vice versa.

In certain embodiments, the actions in the flow charts can be performed by the transport processor 340. Certain embodiments as described herein may be implemented as a board level product, as a single chip, application specific integrated circuit (ASIC), or with varying levels of the system integrated on a single chip with other portions of the system as separate components. The degree of integration of the monitoring system may primarily be determined by speed of incoming MPEG packets, and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device wherein the memory storing instructions is implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A system for recording programs, said system comprising:
    a time shift buffer for buffering recently displayed programs on a channel that said system is tuned;
    a memory for storing a plurality of instructions;
    a processor for executing the plurality of instructions, wherein execution of the plurality of instructions causes:
        writing to the time shift buffer the recently displayed programs on the channel that said system is tuned;
        writing a time shift list comprising a presently displaying program, the presently displaying program comprising a plurality of sequential program nodes, each sequential program node being associated with a respective time interval of the presently displaying program;
        receiving, during presentation of the presently displaying program, an input for selecting a remaining portion of the plurality of sequential program nodes, the remaining portion of the plurality of sequential program nodes excluding one of the plurality of sequential program nodes; and
        removing, during presentation of the presently displaying program, the remaining portion of the plurality sequential program nodes from the time shift list and adding the remaining portion of the plurality of sequential program nodes to a permanent record list.

2. The system of claim 1, wherein the presently displaying program further comprises:
    a transport stream node for pointing to a previous program and a next program, the transport stream node being associated with the plurality of sequential program nodes.

3. The system of claim 2, wherein each sequential program node comprises a respective indicator indicating whether the corresponding sequential program node is to be permanently recorded.

4. The system of claim 3, wherein the execution of the plurality of instructions by the processor also causes:
    setting the respective indicators of each of the nodes of the remaining portion of the plurality of sequential program nodes after receiving the input.

5. The system of claim 2, wherein
    each of the plurality of sequential program nodes indicates a respective address in the memory.

6. The system of claim 5, wherein adding the remaining portion of the plurality of sequential program nodes to the permanent record list comprises:
    setting the transport stream node to point to the remaining portion of the plurality of sequential program nodes in the permanent record list.

7. The system of claim 1, wherein the execution of the plurality of instructions also causes:
    receiving a deletion input, the deletion input indicating a selection for deletion of a selected program from one of the time shift list or the permanent record list;
    removing a selected element indicating the selected program from the one of the time shift list or the permanent record list and adding the selected element to a delete list.

8. The system of claim 7, wherein execution of the plurality of instructions also causes:
    receiving a recovery input, the recovery input indicating a selection of a program in the delete list for recovery; and
    removing a selected element in the delete list for recovery from the delete list and adding the selected element to one of the time shift list or the permanent record list.

9. A method for recording programs, said method comprising:
- buffering recently displayed programs on a tuned channel in a memory;
- writing a time shift list comprising a presently displaying program, the presently displaying program comprising a plurality of program nodes, each program node being associated with a respective time interval of the presently displaying program;
- receiving, at a point of time during presentation of the presently displaying program, an input for selecting a remaining node of the plurality of program nodes, the remaining node being associated with a presentation time following the point of time; and
- removing the remaining node from the time shift list and adding the remaining node to a permanent record list.

10. The method of claim 9, wherein the presently displaying program further comprises:
- a transport stream node for pointing to a previous program and a next program, the transport stream node being associated with the plurality of program nodes.

11. The method of claim 10, wherein each of the plurality of program nodes comprises a respective indicator indicating whether the corresponding program node is to be permanently recorded.

12. The method of claim 11, further comprising:
- setting the respective indicator of the remaining node after receiving the input.

13. The method of claim 10, wherein
each of the plurality of program nodes indicates a respective address in the memory.

14. The method of claim 13, wherein adding the remaining node to the permanent record list further comprises:
- setting the transport stream node to point to the remaining node in the permanent record list.

15. The method of claim 9, further comprising:
- receiving a deletion input, the deletion input indicating a selection for deletion of a selected program from one of the time shift list or the permanent record list; and
- removing a selected element indicating the selected program from the one of the time shift list or the permanent record list and adding the selected element to a delete list.

16. The method of claim 15, further comprising:
receiving a recovery input, the recovery input indicating a selection of a program in the delete list for recovery; and
removing a selected element in the delete list for recovery from the delete list and adding the selected element to one of the time shift list or the permanent record list.

17. A system comprising:
a processor configured to:
- write to a time shift buffer a presently displaying program on a channel that said system is tuned, the presently displaying program comprising a plurality of sequential program nodes, each sequential program node being associated with a respective time interval of the presently displaying program;
- write a time shift list, the time shift list comprising the presently displaying program, the time shift list being associated with the time shift buffer;
- receive, at a point of time during presentation of the presently displaying program, an input for selecting a plurality of remaining program nodes of the plurality of sequential program nodes, the plurality of remaining nodes being associated with a presentation time following the point of time; and
- remove the plurality of remaining program nodes from the time shift list and add the plurality of remaining program nodes to a permanent record list, the permanent record list being associated with a permanent record memory.

18. A system of claim 17, wherein the plurality of sequential program nodes is associated with a transport stream node, the transport stream node pointing to a previous program and a next program.

* * * * *